United States Patent

Szabo

[15] 3,691,163
[45] Sept. 12, 1972

[54] CERTAIN PHOSPHORUS-CONTAINING THIOMORPHOLINONES

[72] Inventor: Karoly Szabo, Syracuse, N.Y.

[73] Assignee: Esso Research and Engineering Company

[22] Filed: Aug. 3, 1970

[21] Appl. No.: 60,774

[52] U.S. Cl. ................................260/243 B, 424/200
[51] Int. Cl. ..............................................C07d 93/10
[58] Field of Search ...................................260/243 B

[56] References Cited

UNITED STATES PATENTS

| | | | |
|---|---|---|---|
| 2,706,194 | 4/1955 | Morris et al. | 260/243 B |
| 3,057,774 | 10/1962 | Baker et al. | 260/243 B |
| 3,099,674 | 7/1963 | Schrader | 260/243 B |
| 3,359,266 | 12/1967 | Maier | 260/243 B |

Primary Examiner—Alex Mazel
Assistant Examiner—R. J. Gallagher
Attorney—Chasan and Sinnock and John Paul Corcoran

[57] ABSTRACT

Organophosphorus compounds containing the thiomorpholinone moiety have been found to be highly active both as contact and systemic insecticides and miticides. These compounds also possess excellent acaricidal activity. These compounds are represented by one of the following structural formulas:

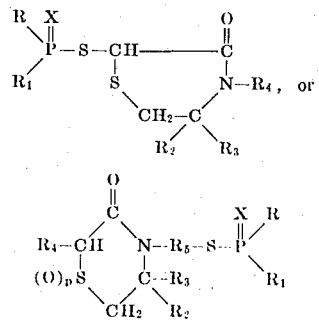

wherein R and $R_1$ may be the same or different and are selected from the group consisting of $C_1$ to $C_6$ alkoxy, $C_1$ to $C_6$ alkyl, $C_2$ to $C_6$ alkoxymethyl, and $C_1$ to $C_6$ alkylthio; provided that at least one of them is alkoxy; $R_2$ and $R_3$ may be the same or different and are selected from the group consisting of hydrogen and $C_1$ to $C_6$ alkyl; $R_4$ is one selected from the group consisting of hydrogen, $C_1$–$C_6$ alkyl, $C_1$–$C_6$ alkylthio, $C_1$–$C_6$ alkoxyl and $C_1$–$C_6$ alkyl optionally substituted with hydroxyl, amino, cyano, $C_1$–$C_6$ N alkyl carbamoyl, $C_1$–$C_6$ alkoxycarbamido, substituted and unsubstituted phenyl, $C_1$–$C_6$ carboalkoxyalkyl and acetoxyl; $R_5$ is one selected from the group consisting of $(CH_2)_n$ and $CH_2$–$CHR_{C6}$ wherein $R_6$ is one selected from the group consisting of hydrogen, $C_1$ to $C_6$ alkyl, $C_1$ to $C_6$ alkylthio; X is $O$ or $S$, $n$ is an integer ranging from 1 to 6 and $p$ is 0–2.

18 Claims, No Drawings

CERTAIN PHOSPHORUS-CONTAINING THIOMORPHOLINONES

This invention relates to new organic compounds containing phosphorus. In one aspect, this invention relates to organophosphorus compounds containing a thiomorpholinone moiety. In still another aspect this invention relates to the use of these compounds as insecticidal and acaricidal agents.

The new compounds that are provided by this invention conform in structure to one of the following structural formulas:

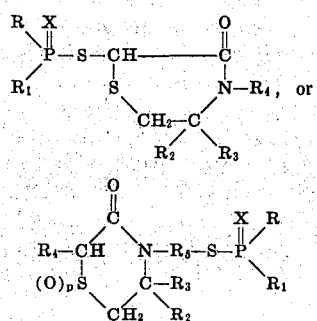

wherein R and $R_1$ may be the same or different and are selected from the group consisting of $C_1$ to $C_6$ alkoxy, $C_1$ to $C_6$ alkyl, $C_2$ to $C_6$ alkoxymethyl, and $C_1$ to $C_6$ alkylthio; provided that at least one of them is alkoxy; $R_2$ and $R_3$ may be the same or different and are selected from the group consisting of hydrogen and $C_1$ to $C_6$ alkyl; $R_4$ is selected from the group consisting of hydrogen, $C_1$–$C_6$ alkyl, $C_1$–$C_6$ alkylthio, $C_1$–$C_6$ alkoxyl and $C_1$–$C_6$ alkyl optionally substituted with hydroxyl, amino, cyano, $C_1$–$C_6$ N alkyl carbamoyl, $C_1$–$C_6$ alkoxycarbamido, substituted and unsubstituted phenyl, $C_1$–$C_6$ carboalkoxyalkyl and acetoxyl; $R_5$ is one selected from the group consisting of $(CH_2)_n$ and $CH_2$–$CHR_6$ wherein $R_6$ is one selected from the group consisting of hydrogen, $C_1$–$C_6$ alkyl, $C_1$–$C_6$ alkylthio; X is O or S, $n$ is an integer ranging from 1 to 6 and $p$ is 0–2.

Exemplary of the compounds which are encompassed by this invention are the following:

Compound No.
1  O,O-diethyl-S-[thiomorpholinon(3)-yl(2)]-phosphorodithioate
2  O,O-diethyl-S-[N-ethylthiomorpholinon(3)-yl(2)]-phosphorodithioate
3  O,O-dimethyl-S-[thiomorpholinon(3)-yl(2)]-phosphorodithioate
4  O,O-dimethyl-S-[N-ethylthiomorpholinon(3)-yl(2)]-phosphorodithioate
5  O,O-diethyl-S-[N-methylthiomorpholinon(3)-yl(2)]-phosphorodithioate
6  O,O-dimethyl-S-[N-methylthiomorpholinon(3)-yl(2)]-phosphorodithioate
7  O,O-diethyl-S-[N-methylthiomorpholinon(3)yl(2)]-phosphorothiolate
8  O,O-diethyl-S-[thiomorpholinon(3)yl(2)]-phosphorothiolate
9  O,O-dimethyl-S-[thiomorpholinon(3)yl(2)]-phosphorothiolate
10  O,O-diethyl-S-[N-ethylthiomorpholinon(3)yl(2)]-phosphorothiolate
11  O,O-dimethyl-S-[N-ethylthiomorpholinon(3)yl(2)]-phosphorothiolate
12  O-ethyl-S-[N-ethylthiomorpholinon(3)yl(2)]-methoxymethylphosphonodithioate
13  O-ethyl-S-[thiomorpholinon(3)yl(2)]-methoxymethylphosphonodithioate
14  O,O-diethyl-S-[N-butylthiomorpholinon(3)yl(2)]-phosphorodithioate
15  O,O-diethyl-S-[N-butylthiomorpholinon(3)yl(2)]-phosphorothiolate
16  O-ethyl-S-[N-butylthiomorpholinon(3)yl(2)]-ethylphosphonodithioate
17  O,O-diethyl-S-[5-ethylthiomorpholinon(3)yl(2)]-phosphorodithioate
18  O,O-diethyl-S-[5-methylthiomorpholinon(3)yl(2)]-phosphorothiolate
19  O,O-diethyl-S-[5,5-dimethylthiomorpholinon(3)yl(2)]-phosphorodithioate
20  O,O-dimethyl-S-[5-ethylthiomorpholinon(3)yl(2)]-phosphorothiolate
21  O,O-diethyl-S-[5-ethylthiomorpholinon(3)yl(2)]-phosphorothiolate
22  O,O-diethyl-S-[5,5-dimethylthiomorpholinon(3)-yl(2)]-phosphorothiolate
23  O,O-diethyl-S-[5,5-dimethylthiomorpholinon(3)-yl(2)]-phosphorodithioate
24  O,O-diethyl-S-[5-methylthiomorpholinon(3)yl(2)]-phosphorodithioate
25  O,O-dimethyl-S-[5-methylthiomorpholinon(3)yl(2)]-phosphorodithioate
26  O,O-dimethyl-S-[5,5-dimethylthiomorpholinon(3)yl(2)]-phosphorothiolate
27  O-ethyl-S-[5-ethylthiomorpholinon(3)yl(2)]-ethylphosphonodithioate
28  O,O-dimethyl-S-[5-ethylthiomorpholinon(3)yl(2)]-phosphorodithioate
29  O,O-diethyl-S-[4-(N-methylcarbomolyoxyethyl)-thiomorpholinon(3)yl(2)]-phosphorodithioate
30  O,O-diethyl-S-[4-(N-methylcarbamoylxyethyl)-thiomorpholinon(3)yl(2)]-phosphorothiolate
31  O,O-dimethyl-S-[4-(N-methylcarbamoyloxyethyl)-thiomorpholinon(3)yl(2)]-phosphorothiolate
32  O,O-dimethyl-S-[N-phenethylthiomorpholinon(3)yl(2)]-phosphorothiolate
33  O,O-diethyl-S-[N-phenethylthiomorpholinon(3)yl(2)]-phosphorothiolate
34  O,O-dimethyl-S-[N-phenethylthiomorpholinon(3)yl(2)]-phosphorodithioate
35  O,O-dimethyl-S-[N-(2-cyanoethyl)-thiomorpholinon(3)-yl(2)]-phosphorothiolate
36  O,O-diethyl-S-[N-(2-cyanoethyl)-thiomorpholinon(3)yl-(2)]-phosphorothiolate
37  O,O-diethyl-S-[N-(2-cyanoethyl)-thiomorpholinon(3)-yl(2)]-phosphorodithioate
38  O,O-dimethyl-S-[N-(acetoxyethyl)-thiomorpholinon(3)-yl(2)]-phosphorothiolate
39  O,O-diethyl-S-[N-(acetoxyethyl)-thiomorpholinon(3)-yl(2)]-phosphorothiolate
40  O,O-diethyl-S-[N-(acetoxyethyl)-thiomorpholinon(3)-yl(2)]-phosphorodithioate
41  O,O-diethyl-S-[N-(2-methoxycarbamidoethyl)-thiomorpholinon(3) yl(2)]-phosphorothiolate
42  O,O-diethyl-S-[N-(2-methoxycarbamidoethyl)-thiomorpholinon(3)yl(2)]-phosphorodithioate
43  O,O-dimethyl-S-[N-(2-methoxycarbamidoethyl)-thiomorpholinon(3)yl(2)]-phosphorothiolate 44 O,O-dimethyl-S-[N-(2-chloroethyl)-thiomorpholinon(3)-yl(2)]-phosphorothiolate
45 O,O-diethyl-S-[N-(2-chloroethyl)-thiomorpholinon(3)-yl(2)]-phosphorothiolate
46 O,O-diethyl-S-[N-(2-chloroethyl)-thiomorpholinon(3)-yl(2)]-phosphorodithioate
47 O,O-dimethyl-S-[N-(2-chloroethyl)-thiomorpholinon(3)-yl(2)]-phosphorodithioate
48 O,O-dimethyl-S-[N-(2-cyanoethyl)-thiomorpholinon(3)-yl(2)]-phosphorodithioate
49 O,O-diethyl-S-[N-isopropylthiomorpholinon(3)yl(2)]-phosphorodithioate
50 O,O-diethyl-S-[N-isopropylthiomorpholinon(3)yl(2)]-phosphorothiolate
51 O,O-dimethyl-S-[N-methylthiomorpholinon(3)yl(2)]-phosphorothiolate
52 O,O-diethyl-S-[2-(4-thiomorpholinon(2)yl(1)-ethyl]-phosphorodithioate
53 O,O-diethyl-S-[2-(4-thiomorpholinon(2)yl(1)-ethyl]-phosphorothiolate
54 O,O-dimethyl-S-[2(4-thiomorpholinon(2)yl(1)-ethyl]-phosphorothiolate
55 O,O-dimethyl-S-[2(4-thiomorpholinon(2)yl(1)-ethyl]-phosphorodithioate
56 O,O-diethyl-S-[2(3-methyl-4-thiomorpholinon(2)yl(Fa1)-ethyl]phosphorothiolate
57 O,O-diethyl-S-[2(3-methyl-4-thiomorpholinon(2)yl(Fa1)-ethyl]phosphorodithioate
58 O,O-diethyl-S-[2(4-thiomorpholinon(2)yl(1)-propyl]phosphorothiolate
59 O,O-diethyl-S-[2(4-thiomorpholinon(2)yl(1)-propyl]phosphorodithioate
60 O,O-dimethyl-S-[2(4-thiomorpholinon(2)yl(1)-propyl]phosphorodithioate
61 O,O-diethyl-S-[2(3-ethylthio-4-thiomorpholinon(2)yl-(1)-ethyl]phosphorodithioate
62 O,O-diethyl-S-[2(3-ethylthio-4-thiomorpholinon(2)yl-(1)-ethyl]phosphorothiolate
63 O,O-diethyl-S-[2(4-thioxomorpholinon(2)yl(1)-ethyl]-phosphorothiolate
64 O,O-diethyl-S-[2(4-thioxomorpholinon(2)yl(1)-ethyl]-phosphorodithioate
65 O,O-diethyl-S{2[3(O,O-diethylphosphorodithio)-4-thiomorpholinon[2]yl[1]-ethyl}phosphorodithioate
66 O,O-diethyl-S-[2(3-carboethoxymethyl-4-thiomorpholinon(2)yl(Fa1)-ethyl]phosphorodithioate
67 O,O-diethyl-S-[2(3-carboethoxymethyl-4-thiomorpholinon(2)yl(Fa1)-ethyl]phosphorothiolate The foregoing compounds can be readily prepared by the following synthetic methods.

Thiomorpholinone is prepared by the method described by Bestien et al. (Ann., 566, 219 (1950)). The novel compounds then can be readily obtained by halogenating the appropriate thiomorpholinone with a suitable halogenating agent such as chlorine, bromine, sulfuryl chloride, and the like. The product is then reacted with a phosphoro or phosphono thioic acid in the presence of a base according to the following scheme:

Reaction I

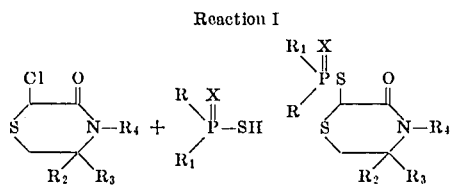

Reaction II

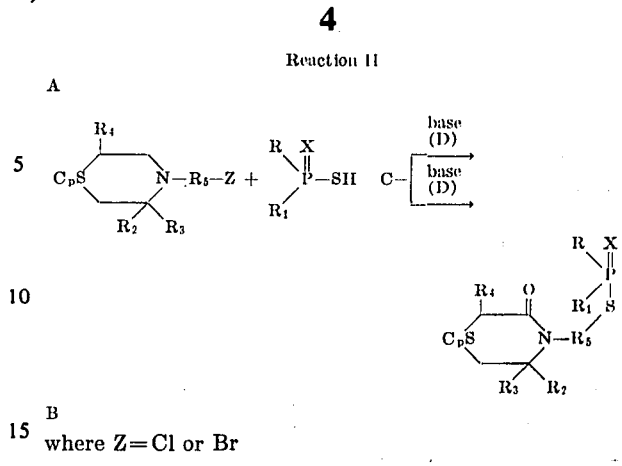

where Z=Cl or Br

The reaction conditions for this reaction are set forth in the following table.

| Reaction | Molar Ratio (A,B,C,D) | Temperature | Pressure | Solvents |
|---|---|---|---|---|
| I | A:C:D=1:1:1 | 25–150° | Atm. | benzene, acetone chloroform, xylene methylene chloride |
| II | B:C:D=1:1:1 | 25–150° | Atm. | ethanol, acetonitrile |

| Bases | Preferred Solvents |
|---|---|
| Triethylamine Potassium carbonate Sodium bicarbonate Pyridine, 1,4-diazabicyclo (2,2,2)octane | benzene, acetone, chloroform and acetonitrile |

| Preferred Bases |
|---|
| Triethylamine and sodium bicarbonate |

Insecticidal compositions of the invention are prepared by admixing one or more of the active ingredients defined heretofore, in insecticidally effective amounts with a conditioning agent of the kind used and referred to in the art as a pest control adjubant or modifier to provide formulations adapted for ready and efficient application using conventional applicator equipment.

Thus, the insecticidal compositions or formulations are prepared in the form of solids or liquids. Solid compositions are preferably in the form of granulars or dusts.

The compositions can be compounded to give homogeneous free flowing dusts by admixing the active compound or compounds with finely divided solids, preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by adsorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50 percent by weight or more concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the ionic or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1 percent or less. Usually, the minimum lower concentration will be 0.1 percent.

The active compound is, of course, applied in an amount sufficient to exert the desired pesticidal action. The amount of the active compound present in the compositions as actually applied for destroying pests will vary with the manner of application, the particular pests for which control is sought, the purpose for which the application is being made, and like variables. In general, the pesticidal compositions as applied in the form of a spray, dust or granular, will contain from about 0.1 percent to 100 percent by weight of the active compound.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert, and as used, can be a solid or fluid. When solid carriers are used, they are preferably particulate, granular, or pelleted; however, other shapes and sizes of solid carrier can be employed as well. Such preferable solid carriers can be natural occurring minerals, although subsequently subjected to grinding, sieving, purification, and/or other treatments, including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols, such as diethylene glycol, to neutralize this activity and thereby prevent possible decomposition of the present thiomorpholinone derivatives.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor", a bitumen, an asphaltite, a wax for example, beeswax or a mineral wax, such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575°F., or boiling in the range of about 575° to about 1,000°F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. %. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely-powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely-divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731" are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about six to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol" sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely-divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols, ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

The structures in all of the following examples were confirmed by spectral analysis, such as NMR and infrared, and the refractive indices of all compounds synthesized (Compound Nos. 1–67) were also recorded.

Example 1 — O,O-Diethyl-S-[N-Ethylthiomorpholinon(3)-yl-(2)]-Phosphorodithioate

N-Ethylthiomorpholinone-(3) (14.5 g, 0.1 M) was dissolved in 70 ml of $CHCl_3$ and placed in a three-necked reaction flask equipped with a magnetic stirrer, reflux condensor, thermometer, dropping funnel and outside ice water cooling bath. 15 g of $SO_2Cl_2$ was dropwise added to the agitated mixture from the dropping funnel. The rate of addition was adjusted so that the inside temperature stayed below 30°C. When addition was complete the mixture was stirred at room temperature for 20 minutes. The volatiles were stripped at reduced pressure to leave 18 g of product (yield≈100 percent), a light brown oil with a refractive index of 1.5470 at 22°C. Spectral and elemental analysis confirmed the postulated structure. To this product a mixture of 18.6 g of diethylphosphorodithioic acid, 12 g of triethylamine and 100 ml benzene was added gradually with stirring while maintaining the reaction temperature below 20°C with the aid of a cold water bath. The separation of $Et_3N \cdot HCl$ soon started. When addition was complete the mixture was heated to reflux for 30 minutes, then allowed to cool. The aminehydrochloride was filtered out by suction, yield 13.5 g. The filtrate was washed with saturated $Na_2CO_3$ solution and water subsequently (100 ml each), dried over anhydrous $MgSO_4$, filtered and stripped to yield 28.5 g of a brown oil (87 percent of theory). $N_D^{17} = 1.5622$. Elemental and spectral analysis is in good agreement with the proposed structure.

| Calculated For: | Theory | Found |
|---|---|---|
| C | 32 | 31.85 |
| N | 4.65 | 4.74 |
| S | 32.20 | 33.00 |

Example 2 — Preparation of O,O-Diethyl-S-[Thiomorpholinon(E)-yl-(2)]-Phosphorodithioate Thiomorpholinone-(3) (47 g, 0.4 M) was taken up in 300 ml chloroform and chlorinated with 57 g sulfuryl chloride following the procedure of Example 1. After removing the volatiles the product was dissolved in 370 ml of acetone. Fifty-five ml of this acetone stock solution was placed in a reaction flask equipped with stirrer, reflux condensor and thermometer and a mixture of diethylphosphorodithioic acid (9.3 g), triethylamine (6 g) and acetone (20 ml) was added in portions. Instantaneous reaction took place with the separation of $Et_3N \cdot HCl$. The reaction mixture was refluxed for 30 minutes, allowed to cool to ambient temperature, dumped in the mixture of 100 ml $H_2O$ and 60 ml saturated aqueous $Na_2CO_3$ solution. The product was extracted several times with small portions of $CH_2Cl_2$. The combined extracts were dried over $MgSO_4$, filtered and stripped to give 9.7 g of product which after a recrystallization from ether melted at 77°C. Elemental and spectral analysis was in good agreement with the composition of the expected product.

Example 3 — Preparation of O,O-Dimethyl-S-[Thiomorpholinon(E)-yl-(2)]-Phosphorodithioate This compound was prepared by the method described under Example 2. After recrystallization from benzene, the product, a white solid, melted at 107°-108°C. Elemental and spectral analysis confirmed the structure.

| Calculated for: | Theory | Found |
|---|---|---|
| S | 35 | 35.31 |

EXAMPLE 4 - Preparation of O,O-Dimethyl-S-[N-Ethylthiomorpholinon(3-yl-(2)]-Phosphorodithioate N-Ethylthiomorpholinone (7.3 g) was monochlorinated as described under Example 1 and subsequently reacted with dimethylphosphorodithioic acid (7.8 g) in the presence of $Et_3N$ (5 g). Ten grams of an oil is obtained as product which solidifies on standing Mp 91.5° C (from cyclohexane + little benzene).

| Calculated for: | Theory | Found |
|---|---|---|
| C | 31.9 | 32.06 |
| H | 5.32 | 5.41 |
| N | 4.65 | 4.55 |
| S | 31.90 | 31.83 |

Example 5 — Preparation of O,O-Dimethyl-S-[N-Methylthiomorpholinon(3)-yl-(2)]-Phosphorodithioate This compound was prepared according to the procedure described for Example 2. The product is a slightly yellow solid. Mp 78.5°C (recrystallized from cyclohexane).

Example 6 - Preparation of O,O-Diethyl-S-[N-Methylthiomorpholinon(3)-yl-(2)]-Phosphorodithioate This compound was prepared according to the procedure of Example 5. The solid product melted at 56°C after recrystallization from ether-petroleum ether mixture.

Example 7 — Preparation of O,O-Diethyl-S-[5,5-Dimethylthiomorpholinon(32)]-Phosphorothiolate Twenty grams of 5,5-dimethylthiomorpholinon(3) was dissolved in 100 ml of chloroform. Twenty grams (7 percent excess) of $SO_2Cl_2$ in 40 ml of chloroform was dropwise added while maintaining the temperature at 25°C. When addition was complete the mixture was refluxed for 30 minutes, then allowed to cool and finally stripped of volatiles. Theoretical amount of product was obtained which was kept cold in chloroform solution. 0.035 M of the thiomorpholinone(3) in 50 ml $CHCl_3$ was added to a mixture of 0.035 M O,O-diethylphosphorothiolic acid, 3.5 g of $Et_3N$ and 35 ml of benzene. The mixture was refluxed overnight with the aid of a waterbath. Next morning the $Et_3N$ hydrochloride is removed by filtration and the filtrate washed with water (30 ml each time, 3 times), dried and treated with charcoal, filtered and stripped to yield 7.5 g of an oil which analyzed in good agreement with the composition, $N_d^{23} = 1.5126$. Infrared analysis confirmed the structure and gas-liquid chromatography indicates an over 98 percent purity.

Example 8 — Preparation of O-Ethyl-S-[Thiomorpholinon(E)-yl-(2)]-Methoxymethylphosphonodithioate 0.03 M of 2-chlorothiomorpholinone(3) dissolved in 30 ml of $CH_2Cl_2$ is added to a mixture of 5.6 g of O-ethyl-methoxymethylphosphonodithioic acid, 3.2 g of triethylamine and 30 ml of $CH_2Cl_2$. The reaction mixture is refluxed for 2 hours, allowed to cool and dumped in water. After separation the organic layer is washed with 150 ml of $K_2CO_3$ solution (5 percent) and water successively. The organic layer is dried over $MgSO_4$, filtered and the volatiles are stripped at reduced pressure to give 6.5 g of a pale yellow oil. $N_D^{21} = 1.5865$. Analyses confirmed expected structure.

| Calculated for: | Theory | Found |
|---|---|---|
| S | 22.47 | 22.50 |
| P | 8.95 | 9.01 |

Example 9 — Preparation of O,O-Diethyl-S-[4-(N-Methylcarbamoyloxyethyl)-Thiomorpholinon(3)-yl-(2)]-Phosphorodithioate

[The 4-(N-methylcarbamoyloxyethyl)-thiomorpholinone (3) intermediate was prepared by the base catalyzed carbamylation of 4-(2'-hydroxyethyl)-thiomorpholinone(3) and methylisocyanate].

0.0166 M of 4-(N-methylcarbamoyloxyethyl)-thiomorpholinone(3) was dissolved in 30 ml chloroform and 0.017 mol $SO_2Cl_2$ was gradually added with stirring. A mildly exothermic reaction took place. The mixture was refluxed for an hour, then stripped of volatiles, to yield an oily product as residue. The residue was dissolved in 30 ml of chloroform and 0.0166 M of diethylphosphorodithioic acid and 0.017 M of $Et_3N$ was successively added. Exothermic reaction took place. The mixture was refluxed for an hour, dumped in 100 ml water; the organic layer was separated, dried over $MgSO_4$, filtered and stripped of volatiles to give 3.5 g of a yellow oil as product. $N_D^{26} = 1.5296$

Example 10 — Preparation of O,O-Dimethyl-S-[N-Phenethylthiomorpholinon(32)]-Phosphorothiolate

[N-phenethylthiomorpholinone(3) was prepared by the reaction of N-phenylethylaziridine and methylthioglycolate. Mp 68°–69°C.].

N-phenylethylthiomorpholinone (15 g) was dissolved in 50 ml chloroform and with good stirring 9 g of $SO_2Cl_2$ was gradually added. After the initial reaction subsides, the mixture was brought to reflux for 1 hour, when reaction was complete, no more HCl was evoluting. The volatiles were stripped at reduced pressure and the solid product dissolved in 100 ml 50:50 chloroform-acetone mixture. Dimethylphosphorothiolic acid (9 g) and triethylamine (7 g) are added to this mixture and refluxed for 1 hour. Allowed to cool, the reaction mixture is dumped in 200 ml $H_2O$, the organic phase separated, dried over $MgSO_4$, treated with charcoal, filtered stripped to yield 14 g of a yellow oil. $N_D^{26} = 1.5640$. It analyzed in good agreement with the proposed structure.

EXAMPLE 11 (Compound No. 37)

O,O-diethyl-S-[N-(2-cyanoethyl)-thiomorpholinon(3)-yl-(2)]-phosphorodithioate.

[N-(2-cyanoethyl)-thiomorpholinon(3), intermediate in this preparation was obtained by the reaction of methylthioglycolate and N-cyanoethylaziridine, $b_5 = 184° - 190°C$, $N_D^{25} = 1.5437$].

9.7 g of $SO_2Cl_2$ was added gradually to a mixture of 12.2 g of N-(2-cyanoethyl)-thiomorpholinon(3) and chloroform (50 ml.). The chlorination took place at room temperature. When addition is complete the reaction mixture is heated to reflux for 10 minutes, allowed to cool and volatils were removed at reduced pressure to yield the chlorinated intermediate. This was dissolved in 100 ml of chloroform and 13 g of O,O-diethylphosphorodithioic acid and 7.3 g of $Et_3N$ were added and the mixture brought to reflux for 1 hour, then allowed to cool and stand at room temperature for night. The reaction mixture is placed in a separating funnel and washed with water three times (35 ml each time). The organic phase is separated, dried over $MgSO_4$, treated with charcoal, filtered and stripped of volatils at reduced pressure to give 18 g of a light brown oil. $N_D^{26} = 1.5630$. IR confirms the expected structure.

EXAMPLE 12, (Compound No. 40)

O,O-diethyl-S-[N-(acetoxyethyl)-thiomorpholinon(3)-yl-(2)]-phosphorodithioate.

[The intermediate, N-(2-acetoxyethyl)-thiomorpholinon(3), was prepared from N-(hydroxyethyl)-thiomorpholinon(3) and acetyl chloride, $N_D^{25} = 1.5153$].

N-(acetoxyethyl)-thiomorpholinon(3) (6.4 g) was dissolved in 50 ml chloroform and 4.5 g of sulfuryl chloride was added with stirring at room temperature. After completing the addition the mixture was refluxed for 2 hours, before stripping the volatils at reduced pressure 8 g of a yellow oil was obtained as product, used without further purification for the next step in the preparation of Compound 40. The product was dissolved in 50 ml of acetone and 6 g of O,O-diethylphosphorodithioic acid and 3.3 g of triethylamine were added and the mixture was stirred at room temperature over night. Some triethylamine hydrochloride separated during night. Next morning the mixture is refluxed for an hour. The hydrochloride, was removed by filtration, the solvent was stripped, the residue was taken up in 100 ml of chloroform. The chloroform solution was washed with water (3 times 50 ml each), dried over $MgSO_4$, treated with charcoal, filtered and stripped of volatils at reduced pressure to yield 10 g of a light brown oil, the instrumental analysis of which is in good accord with the postulated structure. $N_D^{26} = 1.5466$.

Example 13, (Compound No. 41)

O,O-diethyl-S-[N-(2-methoxycarbamido-ethyl)thiomorpholinon(3)-yl-(2)]-phosphorothiolate.

[N-(2-methoxycarbamido-ethyl)-thiomorpholinon(3), the starting material for this preparation, was obtained by the reaction of N-(2-aminoethyl)-thiomorpholinon(3) and methylchloroformate in dioxane. $N_D^{26} = 1.5430$]

N-(2-methoxycarbamido-ethyl)-thiomorpholinon(3) (7.6g) was dissolved in $CH_2Cl_2$ (50 ml) and 4.9 g of $SO_2Cl_2$ (0.2 g excess) was dropwise added at room temperature. When addition was complete, the mixture was briefly heated to reflux, an oil separated. The clear solution was decanted and the heavy oil extracted two times with $CH_2Cl_2$ (20 ml each time). The methylenchloride fractions were combined and the volatils stripped. The residue was taken up in benzene (50 ml) and O,O-diethylphosphorothiolic acid (6 g) and triethylamine (3.7 g) were successively added. Spontaneous reaction followed with the separation of triethylamine hydrochloride. Following the addition the mixture was refluxed for 1 hour, allowed to cool, dumped in 100 ml of water, separated. The organic phase was dried over anhydrous $MgSO_4$, treated with charcoal, filtered and stripped of volatils to give 8 g of a brown oil $N_D^{25} = 1.5339$.

Example 14 (Compound No. 46)

O,O-diethyl-S-[N-(2-chloroethyl)-thiomorpholinon(3)-yl-(2)]-phosphorodithioate.

[N-(2-chloroethyl)-thiomorpholinon(3), starting material of this preparation was obtained by treating N-(2-hydroxyethyl)-thiomorpholinon(3) with thionylchloride. $b_{2.5} = 152° - 155°C.$, $b_1 = 140°C.$, $N_D^{24} = 1.5556$. Pale yellow, slightly viscous oil].

N-(2-chloroethyl)-thiomorpholon(3) (4.6 g) was dissolved in 60 ml chloroform and 3.5 g sulfurylchloride was gradually added at room temperature. The chlorination seemed to be spontaneous with the evolution of HCl and heat.

Following the addition the mixture was refluxed for one-half hour, allowed to cool and stripped of volatils at reduced pressure. The residue is taken up in 50 ml of $CH_2Cl_2$ and placed in a reaction flask equipped with reflux condensor and magnetic stirrer. 4.7 g of O,O-diethylphosphorodithioic acid and 2.7 g of triethylamine were added and the mixture refluxed for 30 minutes, triethylamine hydrochloride separated. The reaction mixture was dumped in 100 ml of water, separated and additionally washed with water two times (50 ml each time). The organic phase was dried over $MgSO_4$, filtered and stripped of volatils to yield 6.5 g of a yellow oil as product. $N_D^{26} = 1.5700$. Analyses of the product were in good agreement with the expected structure.

Example 15 — (Compound 52)

O,O-diethyl-S-[2-(4-thiomorpholinon(2)-61-(1)]-ethyl phosphorodithioate.

N-(2-chloroethyl)-thiomorpholinon(3) (3.6g), O,O-diethylphosphorodithioic acid (3.5g), triethylamine (2g) in 50 ml. of benzene are brought together and refluxed for 50 minutes. Abundant amount of triethylamine hydrochloride separate during this period. The mixture was allowed to cool to ambient temperature and dumped in 50 ml water, the benzene layer separate, dried over $MgSO_4$, treated with charcoal, filtered and stripped of volatils to yield 4.9 g (78 percent of theory) of a light yellow viscous oil. $N_D^{24} = 1.5590$. Elemental and instrumental analysis confirmed the expected structure. (Purity by GLC 98 percent.)

| Calculated for: | Theoretical | Found |
|---|---|---|
| C | 35.4 | 35.20 |
| H | 6.7 | 6.93 |
| N | 4.26 | 4.05 |
| P | 9.42 | 9.51 |
|   | 29.20 | 28.70 |

Example 16 — (Compound 53)

O,O-diethyl-S[2-(4-thiomorpholinon(2)-yl-(1)]-ethyl-phosphorothiolate.

N-(2-chloroethyl)-thiomorpholinon(3) (3.6 g), O,O-diethylphosphorothiolic acid (3.4 g) and triethyl-amine (2 g) were dissolved in 50 ml of benzene and the mixture was refluxed for 2 hours. The reaction mixture was worked up as shown in Example 1 to yield 4.5 g of a pale yellow oily product. $N_D^{25} = 1.5305$.

Example 17

Representative organophosphorus compounds from those prepared in the previous examples were evaluated for their insecticidal and acaricidal activity. The test procedures employed were as follows.

The new phosphorylated thiomorpholinons of the subject invention were applied to insects in the green house and in the laboratory to determine their biological activity.

The experimental compounds were tested as aqueous emulsions. These emulsions were prepared by dissolving the compound in acetone and dispersing it in distilled water with Triton X-100 an alkylaryl polyether alcohol derived by the reaction of 1-octylphenol with ethylene oxide to give spray emulsions containing the desired concentration of the compound. These emulsions were then used in standard laboratory tests described below.

Mexican Bean Beetle

Bean leaves were dipped in the emulsion of the test chemical and allowed to dry. The individually treated leaves were placed in Petri dishes and five Mexican bean beetle larvae introduced into each of the two replica dishes.

Mite Contact

Potted bean plants infested with the two spotted spidermites were placed on a turntable and sprayed with a formulation of the test chemical. The plants were held for 7 days and the degree of mite control was rated after this period.

Mites Systemic

Bean plants were treated by applying 20 milliliters of the formulated test chemical to the soil. The mites were transferred to the plants after 24 hours. Plants were held for 7 more days and the degree of mite control rated.

Aphid Contact

Potted nasturtium plants infested with the bean aphids were placed on a turntable and sprayed with a formulation of the test chemical. The plants were held for 2 days and the degree of aphid control was rated.

Aphid Systemic

Nasturtium plants are treated by applying 20 milliliters of the formulated test chemical to the soil. The mites were transferred to the plant after 24 hours. The plants were held for 48 additional hours and the degree of the aphid control rated.

The compounds were also tested against Southern Army Worm (class lepidoptera), other insects of aphid (orderhomoplera), other members of the coleopterous order, such as confused flour beetle and spider beetle boll weevil, and against resistant mites and were found to be active. The results are as follows:

Results of these tests are shown in the following table.

TABLE I

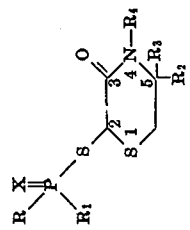

| Compound Number | R | R₁ | R₂ | R₃ | R₄ | X | Refractive index | Mexican bean beetle | Mites, contact Adults | Mites, contact Nymphs | Mites, systemic Adults | Mites, systemic Nymphs | Aphid Contact | Aphid Systemic |
|---|---|---|---|---|---|---|---|---|---|---|---|---|---|---|
| 1 | EtO | EtO | H | H | H | S | $N_D^{25}=1.5922$ | 10 | 10 | 10 | 5 | 0 | 10 | 10 |
| 2 | EtO | EtO | H | H | Et | S | | 10 | 10 | 10 | 10 | 8 | 10 | 10 |
| 3 | MeO | MeO | H | H | Et | S | | 10 | 10 | 10 | 10 | 4 | 10 | 10 |
| 4 | MeO | MeO | H | H | Et | S | | 10 | 10 | 9 | 10 | 10 | 7 | 7 |
| 5 | MeO | MeO | H | H | Me | S | | 10 | 10 | 0 | 9.5 | 0 | 4 | 4 |
| 6 | MeO | MeO | H | H | Me | O | | 10 | 0 | 0 | 10 | 0 | 10 | 10 |
| 7 | EtO | EtO | H | H | H | O | | 10 | 10 | 10 | 10 | 8 | 10 | 10 |
| 8 | MeO | MeO | H | H | Et | O | | 10 | 10 | 10 | 10 | 10 | 10 | 10 |
| 9 | EtO | EtO | H | H | Et | O | | 10 | 10 | 10 | 10 | 10 | 10 | 10 |
| 10 | EtO | MeO | H | H | Et | O | | 10 | 0 | 0 | 10 | 0 | 5 | 3.5 |
| 11 | MeO | MeO | H | H | H | S | $N_D^{27}=1.5315$ | 2 | 0 | 8 | 2 | 0 | 5 | 0 |
| 12 | MeOCH₂ | MeOCH₂ | H | H | H | O | | 5 | 10 | 4 | 0 | 10 | 0 | 1 |
| 13 | EtO | EtO | Me | H | Bu | S | | 8 | 10 | 6 | 10 | 0 | 10 | 0 |
| 14 | EtO | EtO | H | Et | Bu | O | $N_D^{23}=1.5077$ | 10 | 10 | 10 | 0 | 10 | 10 | 2 |
| 15 | EtO | Et | H | Me | Bu | S | $N_D^{23}=1.4993$ | 10 | 10 | 10 | 0 | 0 | 10 | 4 |
| 16 | EtO | EtO | H | Et | H | S | $N_D^{23}=1.5204$ | 10 | 10 | 10 | 0 | 10 | 10 | 10 |
| 17 | MeO | EtO | H | Me | H | S | $N_D^{22}=1.5795$ | 10 | 10 | 10 | 0 | 10 | 10 | 2 |
| 18 | EtO | EtO | Me | Et | H | O | $N_D^{21}=1.5865$ | 10 | 10 | 10 | 0 | 10 | 10 | 10 |
| 19 | EtO | EtO | H | Me | H | O | $N_D^{23}=1.5440$ | 10 | 10 | 10 | 10 | 10 | 10 | 10 |
| 20 | EtO | EtO | Me | Me | H | S | $N_D^{22}=1.5170$ | 10 | 10 | 10 | 10 | 10 | 10 | 10 |
| 21 | MeO | MeO | H | Me | H | S | $N_D^{23}=1.5505$ | 10 | 10 | 10 | 0 | 9 | 10 | 10 |
| 22 | MeO | EtO | Me | Me | H | O | $N_D^{23}=1.5014$ | 10 | 10 | 10 | 0 | 10 | 10 | 2 |
| 23 | EtO | EtO | H | Me | H | O | $N_D^{33}=1.5395$ | 10 | 10 | 10 | 0 | 10 | 10 | 10 |
| 24 | EtO | EtO | H | Me | H | O | $N_D^{23}=1.5263$ | 10 | 10 | 10 | 10 | 0 | 10 | 2 |
| 25 | MeO | MeO | H | Et | H | O | $N_D^{23}=1.5126$ | 10 | 10 | 10 | 10 | 9 | 10 | 10 |
| 26 | MeO | MeO | H | Me | H | S | $N_D^{23}=1.5620$ | 10 | 10 | 10 | 1 | 2 | 10 | 6 |
| 27 | EtO | Et | H | Et | H | O | $N_D^{23}=1.5469$ | 10 | 4 | 8 | 0 | 8 | 9 | 9 |
| 28 | MeO | MeO | H | Et | H | S | $N_D^{35}=1.5170$ | 10 | 10 | 10 | 10 | 10 | 10 | 10 |

Compound number:

| Compound number | R | R₁ | R₂ | R₃ | R₄ | X | Refractive index | Mexican bean beetle | Mites, contact Adults | Mites, contact Nymphs | Mites, systemic Adults | Mites, systemic Nymphs | Aphid Contact | Aphid Systemic |
|---|---|---|---|---|---|---|---|---|---|---|---|---|---|---|
| 29 | EtO | EtO | H | H | CH₂CH₂OCNHCH₃ (O) | S | $N_D^{26}=1.5467$ | 10 | 10 | 10 | 0 | 0 | 3 | 5 |
| 30 | EtO | MeO | H | H | Same as above | O | $N_D^{25}=1.5169$ | 10 | 8 | 6 | 10 | 10 | 10 | 8 |
| 31 | MeO | MeO | H | H | do | O | $N_D^{26}=1.5295$ | 10 | 4 | 7 | 1 | 0 | 10 | 10 |
| 32 | MeO | MeO | H | H | CH₃CH₂C₆H₅ | O | $N_D^{26}=1.5640$ | 10 | 10 | 8 | 10 | 8 | 10 | 9 |
| 33 | EtO | EtO | H | H | CH₃CH₂C₆H₅ | S | $N_D^{26}=1.5579$ | 10 | 9 | 10 | 0 | 1 | 9 | 3 |
| 34 | MeO | EtO | H | H | CH₃CH₂C₆H₅ | O | $N_D^{25}=1.5392$ | 10 | 10 | 10 | 10 | 10 | 8 | 5 |
| 35 | MeO | MeO | H | H | CH₃CH₂CN | O | $N_D^{26}=1.5285$ | 10 | 10 | 10 | 10 | 10 | 8 | 10 |
| 36 | EtO | EtO | H | H | CH₃CH₂CN | O | $N_D^{26}=1.5630$ | 10 | 10 | 10 | 10 | 10 | 10 | 6 |
| 37 | EtO | EtO | H | H | CH₃CH₂CN | S | | 8 | 10 | 10 | 0 | 1 | 7 | 3 |
| 38 | MeO | MeO | H | H | CH₂CH₂OCCH₃ (O) | O | $N_D^{23}=1.5295$ | 0 | 0 | 8 | 0 | 0 | 10 | 4 |
| 39 | EtO | EtO | H | H | Same as above | O | $N_D^{26}=1.5220$ | 0 | 10 | 7 | 2 | 1 | 3 | 0 |
| 40 | EtO | EtO | H | H | do | S | $N_D^{26}=1.5466$ | | | | | | | |

3,691,163

| | R | $R_1$ | $R_2$ | $R_3$ | $R_4$ | X | Refractive index | Mexican bean beetle | Mites, contact Adults | Mites, contact Nymphs | Mites, systemic Adults | Mites, systemic Nymphs | Aphid Contact | Aphid Systemic |
|---|---|---|---|---|---|---|---|---|---|---|---|---|---|---|
| 41 | EtO | EtO | H | H | CH₂CH₂NHC(=O)OCH₃ | O | $N_D^{25}=1.5339$ | 10 | 10 | 0 | 0 | 0 | 10 | 9 |
| 42 | EtO | EtO | H | H | Same as above | S | $N_D^{26}=1.5566$ | 10 | 3 | 1 | 0 | 1 | 3 | 0 |
| 43 | MeO | MeO | H | H | do | O | $N_D^{26}=1.5308$ | 10 | 10 | 10 | 0 | 0 | 5 | 1 |
| 44 | MeO | MeO | H | H | CH₂CH₂Cl | O | $N_D^{26}=1.5005$ | 10 | 10 | 8 | 0 | 8 | 10 | 10 |
| 45 | EtO | EtO | H | H | CH₂CH₂Cl | S | $N_D^{26}=1.5368$ | 10 | 10 | 9 | 9 | 0 | 10 | 10 |
| 46 | MeO | MeO | H | H | CH₂CH₂Cl | S | $N_D^{24}=1.5700$ | 10 | 10 | 10 | 1 | 0 | 10 | 10 |
| 47 | MeO | MeO | H | H | CH₂CH₂Cl | S | $N_D^{24}=1.5738$ | 6 | 7 | 8.5 | 0 | 0 | 8.5 | 8 |
| 48 | MeO | MeO | H | H | CH₂CH₂CN | S | $N_D^{24}=1.5380$ | 10 | 0 | 0 | 0 | 0 | 5 | 6 |
| 49 | EtO | EtO | H | H | i-Pr | O | $N_D^{26}=1.5552$ | 10 | 10 | 10 | 6 | 4 | 10 | 6 |
| 50 | EtO | EtO | H | H | i-Pr | O | $N_D^{26}=1.5328$ | 10 | 10 | 10 | 10 | 10 | 5 | 6 |
| 51 | MeO | MeO | H | H | Me | O | $N_D^{24}=1.5238$ | 10 | 10 | 10 | 10 | 10 | | 5 |

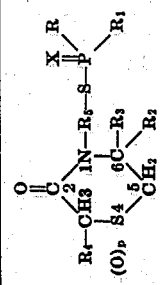

In the following compounds $p$ is 0 in all compounds except numbers 62 and 63 wherein $p$ is 1

| Compound number | R | $R_1$ | $R_2$ | $R_3$ | $R_4$ | $R_5$ | X | Refractive index | Mexican bean beetle | Mites, contact Adults | Mites, contact Nymphs | Mites, systemic Adults | Mites, systemic Nymphs | Aphid Contact | Aphid Systemic |
|---|---|---|---|---|---|---|---|---|---|---|---|---|---|---|---|
| 52 | EtO | EtO | H | H | H | Et | S | $N_D^{24}=1.5590$ | 10 | 10 | 10 | 9 | 10 | 10 | 10 |
| 53 | EtO | EtO | H | H | H | Et | O | $N_D^{25}=1.5305$ | 10 | 10 | 9 | 9 | 10 | 9 | 10 |
| 54 | MeO | MeO | H | H | H | Et | O | $N_D^{25}=1.5327$ | 10 | 8 | 9 | 10 | 8 | 2 | 10 |
| 55 | MeO | MeO | H | H | Me | Et | S | $N_D^{25}=1.5648$ | | | | | | | |
| 56 | EtO | EtO | H | H | Me | Et | S | $N_D^{23}=1.5233$ | | | | | | | |
| 57 | EtO | EtO | H | H | H | Et | S | $N_D^{23}=1.5455$ | 0 | 10 | 10 | 10 | 10 | 0 | 1 |
| 58 | EtO | EtO | H | H | H | —CH₃—CH(CH₃) | S | $N_D^{25}=1.5455$ | 0 | 1 | 3 | 3 | 1 | 0 | 0 |
| 59 | EtO | MeO | H | H | H | Same as above | O | $N_D^{25}=1.5356$ | 0 | 5 | 3 | 4 | 3 | 0 | 0 |
| 60 | MeO | MeO | H | H | EtS | do | S | $N_D^{25}=1.5488$ | 0 | 0 | 0 | 2 | 0 | 0 | 0 |
| 61 | EtO | EtO | H | H | EtS | Et | S | $N_D^{25}=1.5678$ | 0 | 10 | 10 | 0 | 0 | 0 | 2 |
| 62 | EtO | EtO | H | H | H | Et | O | $N_D^{25}=1.5561$ | | | | | | 1 | 4 |
| 63 | EtO | EtO | H | H | H | Et | O | $N_D^{25}=1.5453$ | 0 | 8 | 7 | 0 | 0 | 0 | 10 |
| 64 | EtO | EtO | H | H | H | Et | S | $N_D^{23}=1.5008$ | 0 | 10 | 10 | 0 | 0 | 0 | 2 |
| 65 | EtO | EtO | H | H | (EtO)₂P(=S) | Et | S | $N_D^{25}=1.5550$ | 6 | 10 | 10 | 0 | 0 | 0 | 2 |
| 66 | EtO | EtO | H | H | CH₂COOEt | Et | S | $N_D^{25}=1.5357$ | 0 | 5 | 4 | 0 | 0 | 0 | 4 |
| 67 | EtO | EtO | H | H | CH₂COOEt | Et | S | $N_D^{25}=1.5131$ | 0 | 3 | 2 | 4 | 2 | 1 | 0 |

What is claimed is:
1. Compounds represented by one of the following structures:

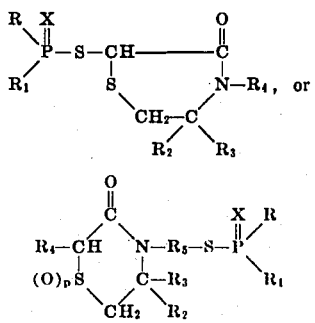

wherein R and $R_1$ may be the same or different and are selected from the group consisting of $C_1$ to $C_6$ alkoxy, $C_1$ to $C_6$ alkyl, $C_2$ to $C_6$ alkoxymethyl, and $C_1$ to $C_6$ alkylthio; provided that at least one of them is alkoxy; $R_2$ and $R_3$ may be the same or different and are selected from the group consisting of hydrogen and $C_1$ to $C_6$ alkyl; $R_4$ is one selected from the group consisting of hydrogen, $C_1$–$C_6$ alkyl, $C_1$–$C_6$ alkylthio, $C_1$–$C_6$ alkoxyl and $C_1$–$C_6$ alkyl optionally substituted with hydroxyl, amino, cyano, $C_1$–$C_6$ N alkyl carbamoyl, $C_1$–$C_6$ alkoxy carbamido, phenyl, $C_1$–$C_6$ carboalkoxyalkyl and acetoxyl; $R_5$ is one selected from the group consisting of $(CH_2)_n$ and $CH_2$—$CHR_6$, wherein $R_6$ is one selected from the group consisting of hydrogen, $C_1$ to $C_6$ alkyl, $C_1$ to $C_6$ alkylthio; X is O or S, $n$ is an integer ranging from 1 to 6 and $p$ is 0–2.

2. A compound according to claim 1; O,O-diethyl-S-[thiomorpholinon(3ep)-yl-(2)]-phosphorodithioate.

3. A compound according to claim 1; O,O-diethyl-S-[N-ethylthiomorpholinon(3)-yl-(2)]-phosphorodithioate.

4. A compound according to claim 1; O,O-dimethyl-S-[thiomorpholinon(3)-yl-(2)]-phosphorodithioate.

5. A compound according to claim 1; O,O-dimethyl-S-[N-ethylthiomorpholinon(3)-yl-(2)]-phosphorodithioate.

6. A compound according to claim 1; O,O-diethyl-S-[N-methylthiomorpholinon(3)-yl-(2)]-phosphorothiolate.

7. A compound according to claim 1; O,O-dimethyl-S-[N-methylthiomorpholinon(3)-yl-(2)]-phosphorodithioate.

8. A compound according to claim 1; O,O-diethyl-S-[2,2-dimethylthiomorpholinon(3)-yl-(2)]-phosphorothiolate.

9. A compound according to claim 1; O-ethyl-S-[thiomorpholinon(3ep)-yl-(2)]-methoxymethyl-phosphonodithioate.

10. A compound according to claim 1; O,O-diethyl-S-[4-(N-methylcarbamoyloxyethyl)-thiomorpholinon(3)-yl-(2)]-phosphorodithioate.

11. A compound according to claim 1; O,O-dimethyl-S-[N-phenethylthiomorpholinon(3)-yl-(2)]-phosphorothiolate.

12. A compound according to claim 1; O,O-diethyl-S-[N-(2-cyanoethyl)-thiomorpholinon(3)-yl-(2)]-phosphorodithioate.

13. A compound according to claim 1; O,O-diethyl-S-[N-(acetoxyethyl)-thiomorpholinon(3)-yl-(2)]-phosphorodithioate.

14. A compound according to claim 1; O,O-diethyl-S-[N-(2-methoxycarbamido)-ethylthiomorpholinon(3)-yl-(2)]-phosphorothiolate.

15. A compound according to claim 1; O,O-doethyl-S-[N-(2-chloroethyl)-thiomorpholinon(3)-yl-(2)]-phosphorodithioate.

16. A compound according to claim 1; O,O-diethyl-S-[2-(4-thiomorpholinon(2)-yl-(1)]-ethyl-phosphorodithioate.

17. A compound according to claim 1; O,O-diethyl-S-[5-methylthiomorpholinon(3)-yl-(2)]-phosphorothiolate.

18. A compound according to claim 1; O,O-diethyl-S-[2(3-methyl-4-thiomorpholinon(2)-yl-(1)-ethyl]phosphorothiolate.

* * * * *